US009986466B2

(12) United States Patent
Omar

(10) Patent No.: US 9,986,466 B2
(45) Date of Patent: May 29, 2018

(54) ANYCAST-BASED CONTENT DELIVERY WITH MOBILITY SUPPORT

(75) Inventor: Hassan M. Omar, Mount Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 824 days.

(21) Appl. No.: 13/477,842

(22) Filed: May 22, 2012

(65) Prior Publication Data

US 2013/0318245 A1 Nov. 28, 2013

(51) Int. Cl.
| | | |
|---|---|---|
| *H04W 36/00* | (2009.01) |
| *H04W 8/08* | (2009.01) |
| *H04W 80/04* | (2009.01) |
| *H04L 12/46* | (2006.01) |
| *H04L 29/08* | (2006.01) |
| *H04L 12/18* | (2006.01) |

(52) U.S. Cl.
CPC ..... *H04W 36/0011* (2013.01); *H04L 12/4633* (2013.01); *H04W 8/082* (2013.01); *H04W 36/0016* (2013.01); *H04W 80/04* (2013.01); *H04L 12/189* (2013.01); *H04L 12/1854* (2013.01); *H04L 67/1002* (2013.01); *H04L 67/18* (2013.01); *H04L 67/288* (2013.01)

(58) Field of Classification Search
CPC . H04W 80/04; H04W 36/00–36/0033; H04W 8/082; H04L 67/2814; H04L 67/288; H04L 12/4633
See application file for complete search history.

(56) References Cited

U.S. PATENT DOCUMENTS

| 6,415,323 | B1 * | 7/2002 | McCanne et al. ............ 709/225 |
| 8,966,033 | B2 * | 2/2015 | Van der Merwe .............. H04L 29/08729 709/223 |
| 2002/0069278 | A1 * | 6/2002 | Forslow .............. H04L 63/0227 709/225 |
| 2003/0018810 | A1 * | 1/2003 | Karagiannis ............ H04L 45/00 709/238 |
| 2005/0164729 | A1 * | 7/2005 | Narayanan et al. .......... 455/522 |
| 2007/0025329 | A1 * | 2/2007 | Chen ....................... H04W 8/06 370/352 |
| 2007/0243821 | A1 * | 10/2007 | Hundscheidt et al. ...... 455/3.04 |
| 2008/0137691 | A1 * | 6/2008 | Barry et al. .................. 370/503 |
| 2009/0135783 | A1 * | 5/2009 | Khalil et al. .................. 370/331 |

(Continued)

OTHER PUBLICATIONS

Gundavelli et al., Proxy Mobile IPv6, Aug. 2008, RFC 5213, pp. 1-86.*

(Continued)

*Primary Examiner* — Gregory Todd

(57) ABSTRACT

A system may identify a first intermediary device responsible for delivering an anycast stream in a first service area associated with a first foreign agent, identify an active anycast stream, identify a second foreign agent associated with a mobility event, identify a second intermediary device responsible for delivering the active anycast stream in a second service area associated with the second foreign agent, receive an indication that the second intermediary device is different from the first intermediary device, establish a content tunnel between the first foreign agent and the second foreign agent, and route communications associated with the active anycast stream over the content tunnel.

20 Claims, 16 Drawing Sheets

(56) References Cited

U.S. PATENT DOCUMENTS

| | | | | |
|---|---|---|---|---|
| 2011/0026435 A1* | 2/2011 | Weniger | ............... | H04W 8/065 370/254 |
| 2011/0149873 A1* | 6/2011 | Yao et al. | ..................... | 370/328 |
| 2011/0216743 A1* | 9/2011 | Bachmann et al. | .......... | 370/331 |
| 2013/0318245 A1* | 11/2013 | Omar | ........................... | 709/227 |

OTHER PUBLICATIONS

Partridge et al., Host Anycasting Service, Nov. 1993, Request for Comments: 1546, https://tools.ietf.org/pdf/rfc1546.pdf, pp. 1-9.*

C. Perkins, "IP Mobility Support for IPv4," Network Working Group, Request for Comments: 3344, Nokia Research Center, Aug. 2002, pp. 1-99.

E. Fogelstroem et al., "Mobile IPv4 Regional Registration," draft-ietf-mip4-reg-tunnel-04, MIP4 Working Group, Nokia Research Center, Oct. 23, 2006, pp. 1-35.

Z. Al-Qudah et al., "Anycast-Aware Transport for Content Delivery Networks," http://www.2009.org/proceedings/pdf/p301.pdf, 2009, pp. 301-310.

* cited by examiner

| Anycast Address 510 | CDN Provider ID 520 | CDN Controller ID 530 | Time Until Next Update (MM:SS) 540 |
|---|---|---|---|
| 192.168.101.1 | CDN Provider A | ccont1.cdnprovda.ny.net | 43:33 |
| 192.168.102.1 | CDN Provider A | ccont1.cdnprovda.ny.net | 43:33 |
| 192.168.103.1 | CDN Provider B | 192.168.12.1 | 32:01 |
| 192.168.103.2 | CDN Provider B | 192.168.12.2 | 05:44 |

FIG. 5

| Foreign Agent ID 610 | Anycast Address 620 | Intermediary Device ID 630 |
|---|---|---|
| DFA-1 | 192.168.101.1 | intdev1.cdnprovda.nj.net |
| AFA-1 | 192.168.101.1 | intdev2.cdnprovda.nj.net |
| DFA-2 | 192.168.103.1 | 192.169.222.1 |
| DFA-3 | 192.168.103.2 | 192.169.222.2 |

600

| Stream Identifier 1110 | Anycast Address 1120 | Departure Intermediary Device ID 1130 | Arrival Intermediary Device ID 1140 | Impacted Stream Indicator 1150 |
|---|---|---|---|---|
| 00191 | 192.168.101.1 | intdev1.cdnprovda.nj.net | intdev2.cdnprovda.nj.net | YES |
| 00192 | 192.168.101.8 | intdev5.cdnprovda.nj.net | intdev5.cdnprovda.nj.net | NO |

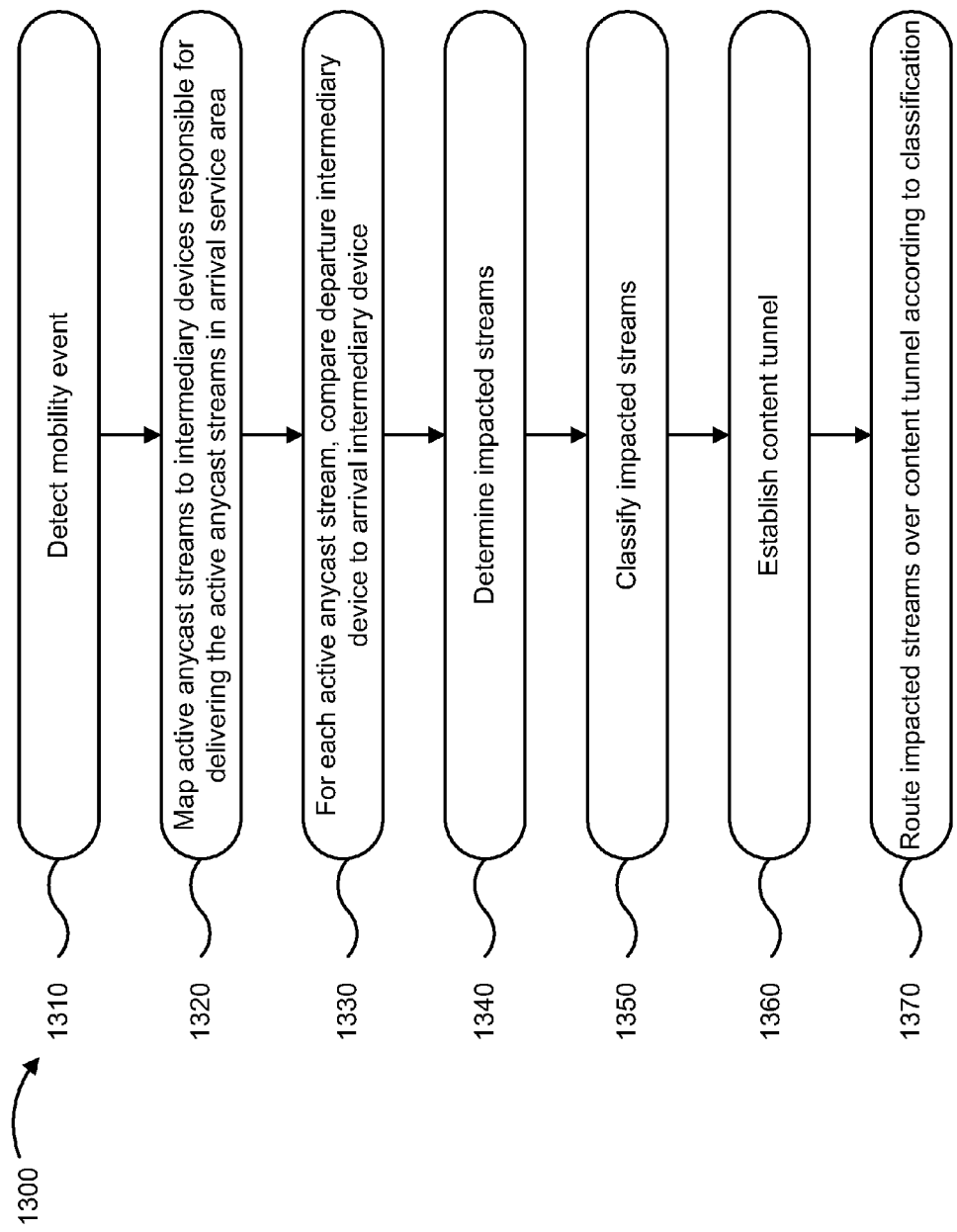

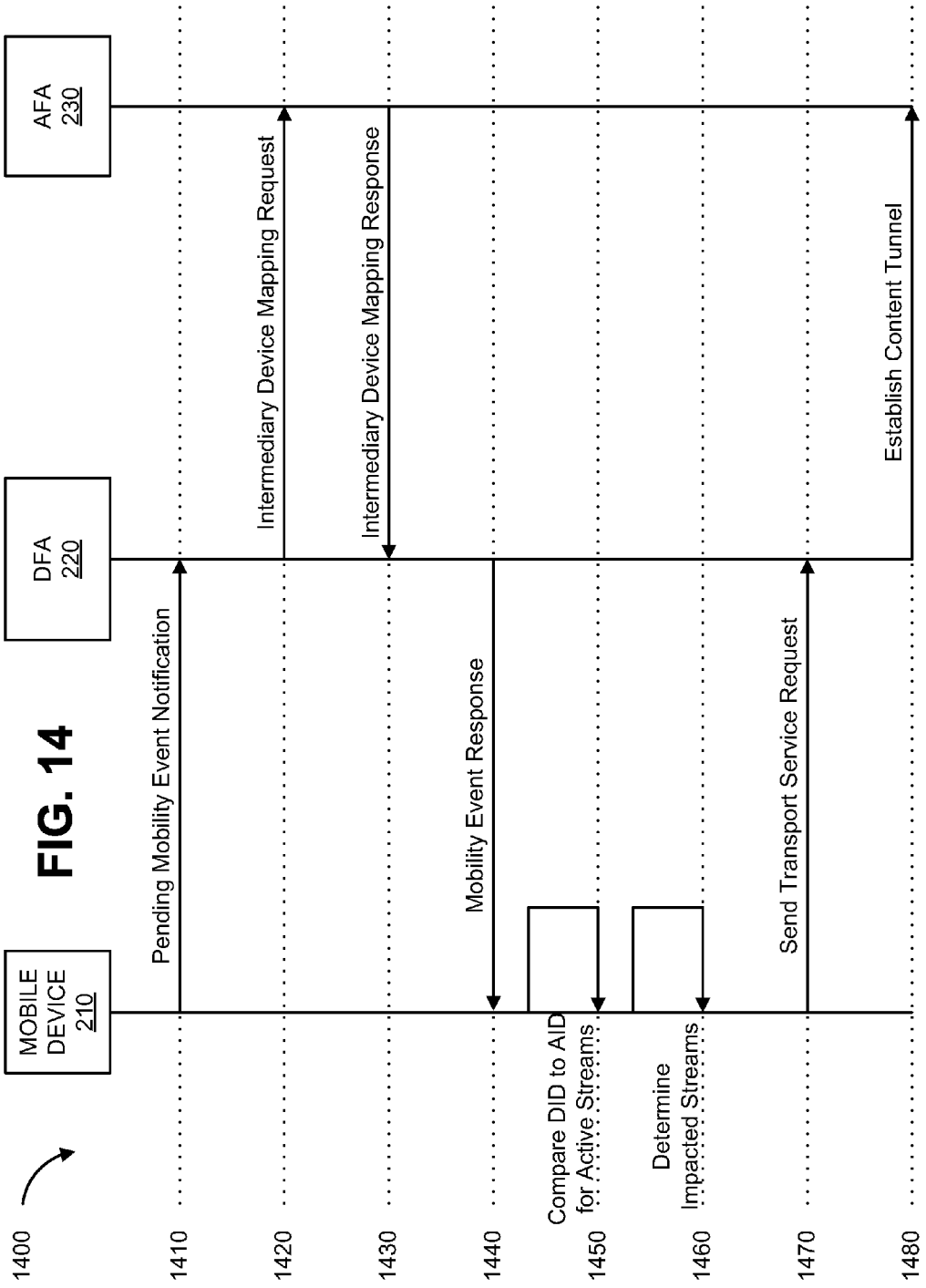

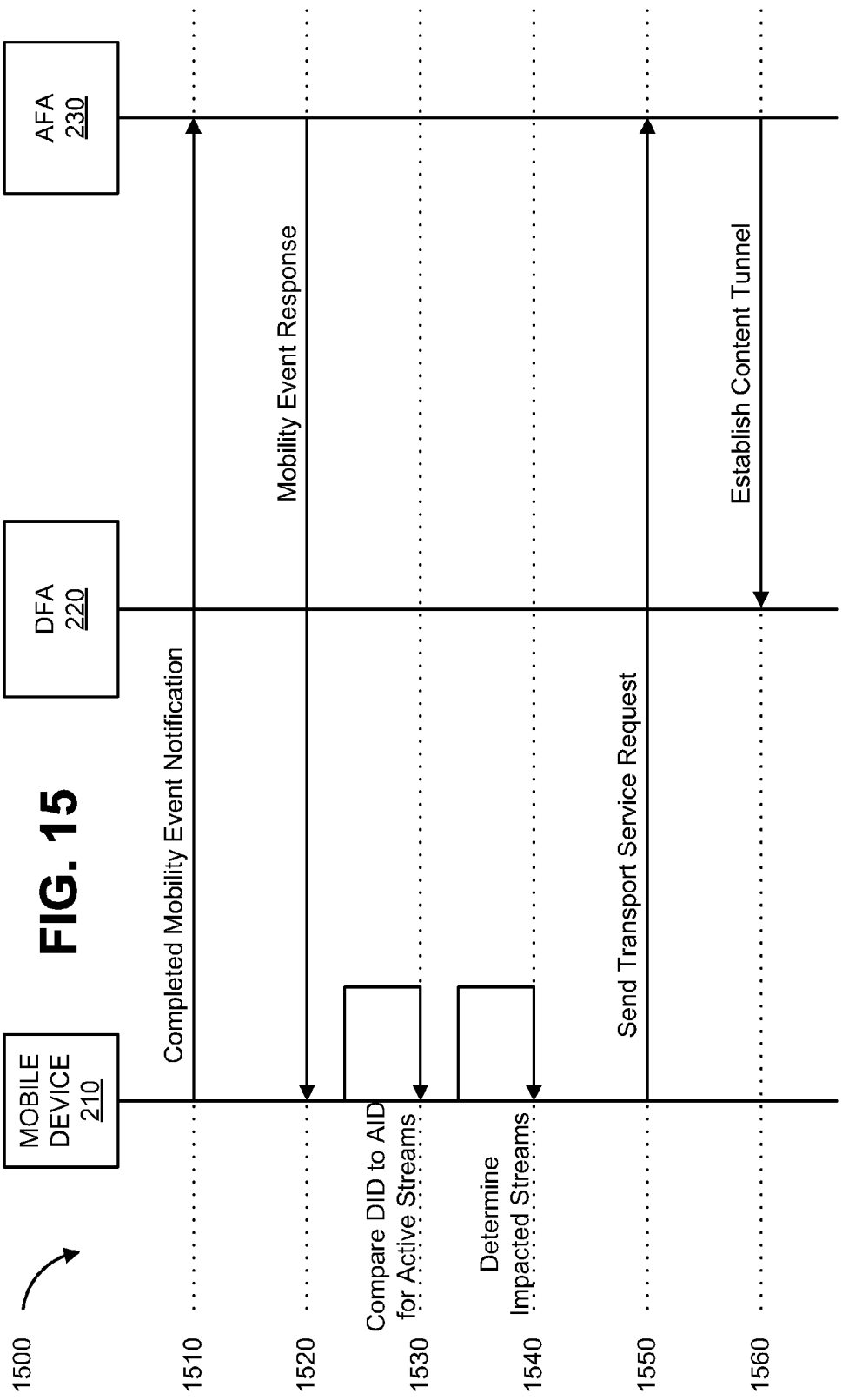

ANYCAST-BASED CONTENT DELIVERY WITH MOBILITY SUPPORT

BACKGROUND

Content delivery networks deliver content to end user devices using intermediary devices, such as cache servers or proxy servers. Different intermediary devices may be used to deliver content to different end user devices, such as end user devices located in different service areas. Often, content delivery networks aim to utilize the most efficient intermediary device when delivering content to end user devices, such as the intermediary device that is closest to the end user device.

Anycast is one of the approaches that can be used by content delivery networks to deliver content through the most appropriate intermediary device. Anycast is a network addressing and routing technique in which traffic is routed to the most appropriate node in a group of potential nodes identified by the same address, such as an Internet Protocol ("IP") address.

BRIEF DESCRIPTION OF THE DRAWINGS

FIG. 5 is a diagram of an example data structure that stores information associated with anycast addresses;

FIG. 11 is a diagram of an example data structure that stores information associated with anycast streams impacted by a mobility event;

FIG. 13 is a diagram of an example process for routing anycast streams impacted by a mobility event;

FIG. 14 is a diagram of an example activity flow for pending mobility events; and FIG. 15 is a diagram of an example activity flow for completed mobility events.

DETAILED DESCRIPTION OF PREFERRED EMBODIMENTS

The following detailed description of example embodiments refers to the accompanying drawings. The same reference numbers in different drawings may identify the same or similar elements.

Content delivery networks often utilize anycast addressing to route content streams through different intermediary devices depending on the service area of an end user device receiving the content stream. This may cause service disruptions to the content stream when an end user device moves from one service area to another service area and the content delivery network attempts to route communications associated with the content stream to and/or from a different intermediary device midstream.

Implementations described herein may prevent anycast content stream service disruptions associated with end user device mobility. This may be achieved by maintaining a route to and/or from an intermediary device when an end user device leaves a service area serviced by the intermediary device.

Anycast content, and anycast streams, as used herein, may refer to content and/or streams being routed using anycast addressing and routing techniques. Anycast content delivery and/or anycast stream delivery may include sending communications (e.g., packets and/or other information associated with anycast content and/or an anycast stream) uni-directionally or bi-directionally between devices. For example, anycast content and/or stream delivery may include sending communications from an intermediary device to a mobile device, and/or sending communications from a mobile device to an intermediary device. In one example, packets carrying a content request may be transmitted from a mobile device to an intermediary device. Packets carrying the requested content may be transmitted from the intermediary device to the mobile device. Packets acknowledging receipt of the packets carrying the requested content may be transmitted from the mobile device to the intermediary device.

Figure 1A:
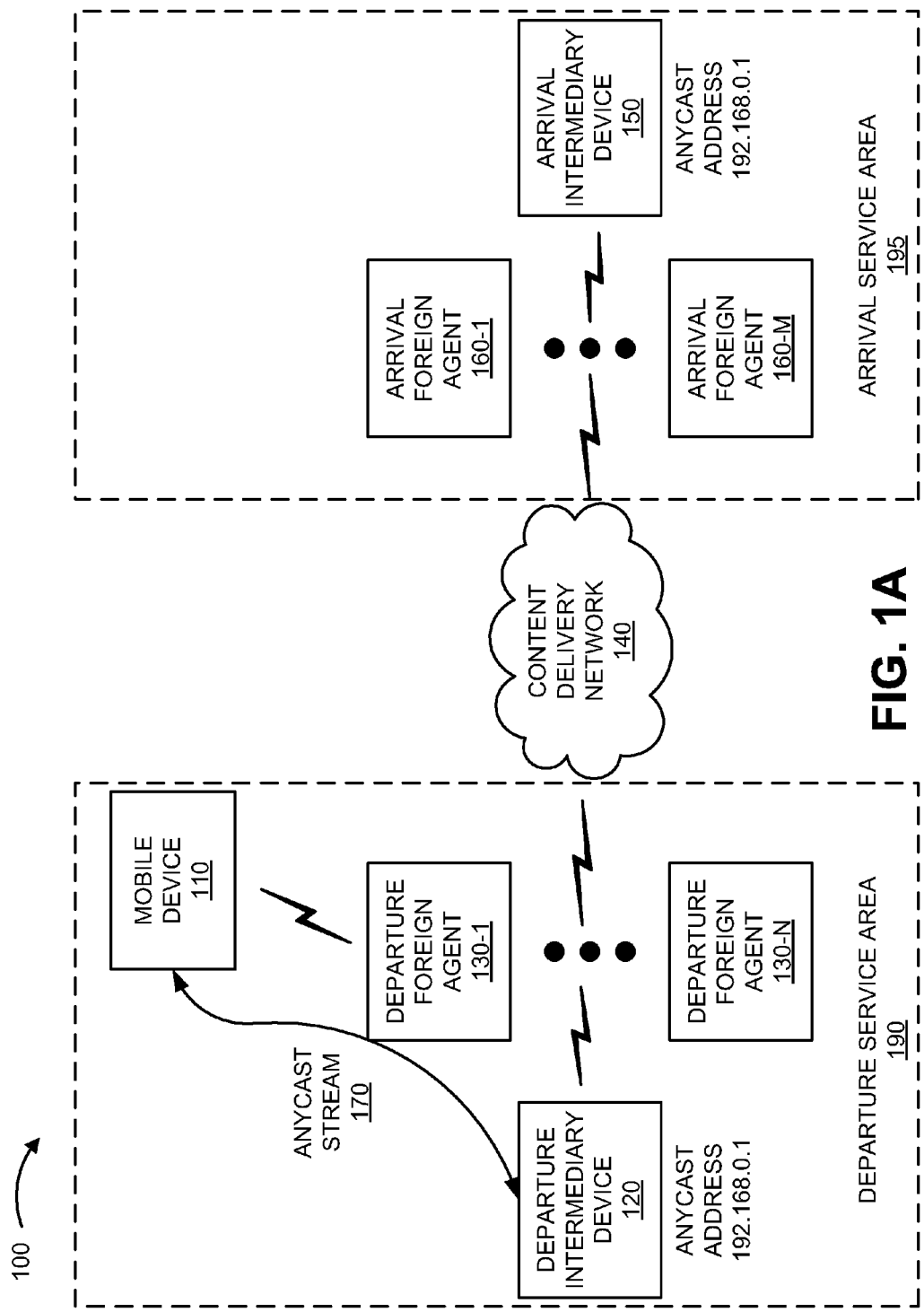
FIGS. 1A and 1B are diagrams that illustrate an overview of an implementation described herein.
Figure 1B:
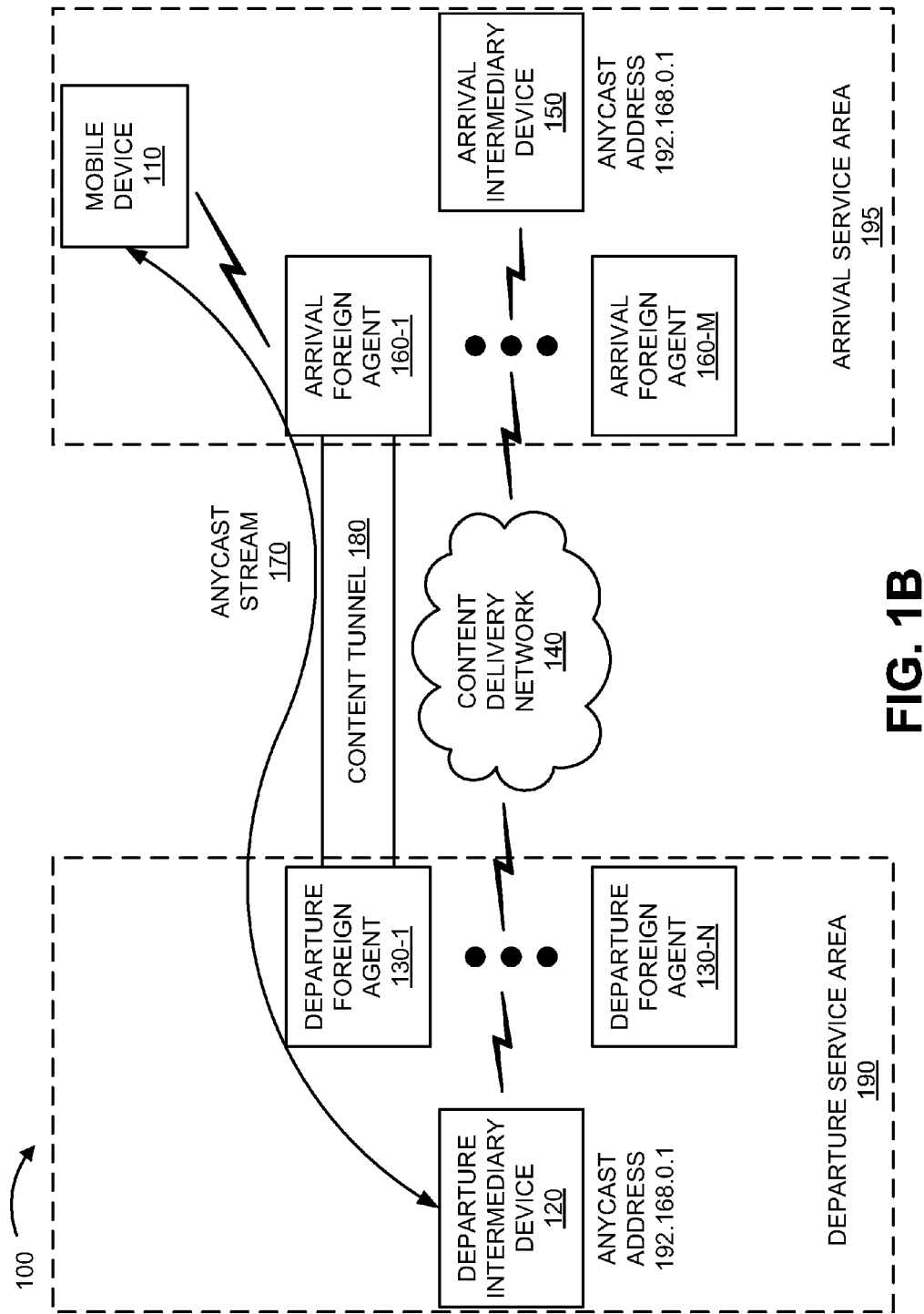

FIGS. 1A and 1B are diagrams that illustrate an overview 100 of an implementation described herein. As illustrated in FIG. 1A, mobile device 110 may be located in a service area (e.g., departure service area 190) serviced by departure intermediary device 120 and a set of departure foreign agents 130-1 through 130-N (N≥1). Departure intermediary device 120 may be associated with an anycast address, such as the illustrated anycast address, "192.168.0.1." Mobile device 110 may receive anycast content transmitted over content delivery network 140. The anycast content may be delivered via departure intermediary device 120 and departure foreign agents 130, as illustrated by anycast stream 170.

As illustrated in FIG. 1B, mobile device 110 may move to a different service area (e.g., arrival service area 195) serviced by arrival intermediary device 150 and a set of arrival foreign agents 160-1 through 160-M (M≥1). Arrival intermediary device 150 may be associated with the same anycast address as departure intermediary device 120, as illustrated (e.g., "192.168.0.1"). The movement of mobile device 110 from departure service area 190 to arrival service area 195 may normally cause communications from mobile device 110 to the anycast address to be delivered to arrival intermediary device 150 (rather than departure intermediary device 120), causing a service disruption. However, content tunnel 180 may be established to aid in delivering communications associated with anycast stream 170 from mobile device 110 to departure intermediary device 120 via arrival foreign agents 160, content tunnel 180, and departure foreign agents 130. Additionally, or alternatively, content tunnel 180 may aid in delivering communications associated with anycast stream 170 from departure intermediary device 120 to mobile device 110 via departure foreign agents 130, content tunnel 180, and arrival foreign agents 160. Delivering anycast content in this manner may prevent service disruptions to anycast streams.

Figure 2:
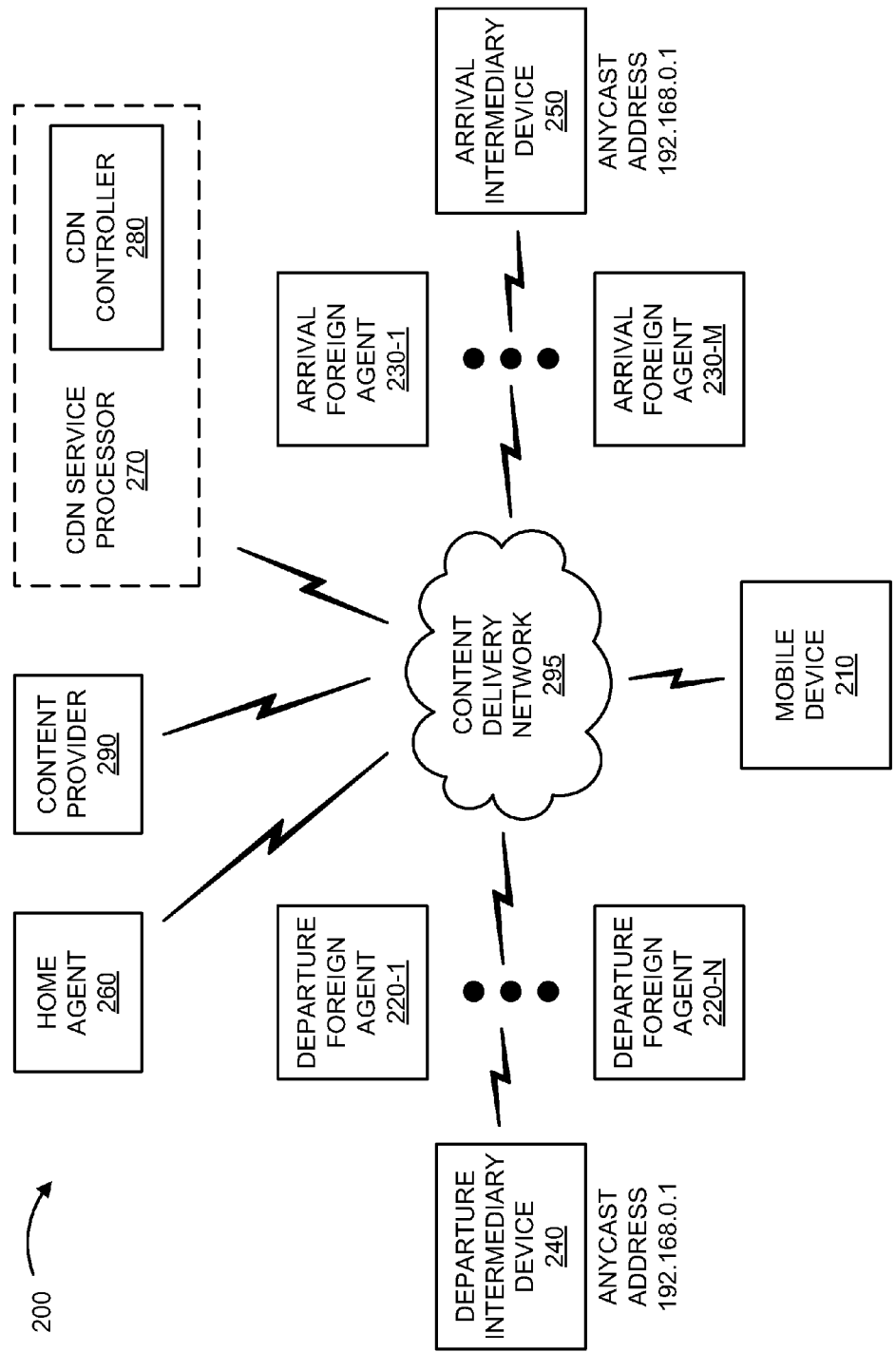
FIG. 2 is a diagram of an example environment in which systems and/or methods described herein may be implemented.

FIG. 2 is a diagram of an example environment 200 in which systems and/or methods described herein may be implemented. Environment 200 may include a mobile device 210, a set of departure foreign agents 220-1 through 220-N (N≥1) (hereinafter referred to individually as "DFA 220" and collectively as "DFAs 220"), a set of arrival foreign agents 230-1 through 230-M (M≥1) (hereinafter referred to individually as "AFA 230" and collectively as "AFAs 230"), a departure intermediary device 240 (hereinafter referred to as "DID 240"), an arrival intermediary device 250 (hereinafter referred to as "AID 250"), a home agent 260 (hereinafter referred to as "HA 260"), a content delivery network service processor 270 (hereinafter referred to as "CDN service processor 270"), a content delivery network controller 280 (hereinafter referred to as "CDN controller 280"), a content provider 290, and a content delivery network 295 (hereinafter referred to as "CDN 295").

The number of devices and networks illustrated in FIG. 2 is provided for explanatory purposes. In practice, there may be additional devices and/or networks, fewer devices and/or networks, different devices and/or networks, or differently arranged devices and/or networks than are illustrated in FIG. 2. Furthermore, two or more of the devices of environment 200 may be implemented within a single device, or a single device may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Mobile device 210 may include any computation or communication device, such as a wireless mobile communication device, that is capable of communicating with a network (e.g., CDN 295) and/or other devices (e.g., FAs 220/230, HA 260, etc.). For example, mobile device 210 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a camera, a personal gaming system, a mobile code reader, and/or another type of mobile computation or communication device. Mobile device 210 may send traffic to and/or receive traffic from any of the devices and/or networks illustrated in environment 200, as well as other devices and/or networks (not illustrated).

DFAs 220 and AFAs 230 (hereinafter referred to individually as "FA 220/230" and collectively as "FAs 220/230") may include one or more computation or communication devices that gather, process, search, store, and/or provide information in a manner described herein. FAs 220/230 may include one or more data processing and/or traffic transfer devices, such as a computer, a server (e.g., a proxy server, a cache server, a signaling server, etc.), a router, a bridge, a gateway, a modem, a firewall, a switch, a network interface card ("NIC"), a hub, an optical add-drop multiplexer ("OADM"), or some other device capable of processing and/or transferring traffic. FAs 220/230 may send traffic to and/or receive traffic from any of the devices and/or networks illustrated in environment 200, as well as other devices and/or networks (not illustrated).

DFAs 220 may transfer traffic to and/or receive traffic from devices located in a different service area than AFAs 230. For example, mobile device 210 may depart a service area associated with DFAs 220 and may enter or arrive at a service area associated with AFAs 230. FAs 220/230 may communicate with wireless network base stations to detect movement of mobile devices 210 from one service area to another service area. FAs 220/230 may keep track of the mobile devices 210 in their service area (e.g., via mobile device registration, Mobile IP, Regional Registration Mobile IP, etc.). FAs 220/230 may perform operations associated with mobility management and/or handing off mobile device 210 (e.g., from DFAs 220 to AFAs 230). An FA 220/230 may tunnel traffic for delivery to mobile device 210 when mobile device 210 is outside of a service area associated with FA 220/230.

DID 240 and AID 250 (hereinafter referred to individually as "intermediary device 240/250" and collectively as "intermediary devices 240/250") may include one or more computation or communication devices that gather, process, search, store, and/or provide information in a manner described herein. Intermediary devices 240/250 may include one or more data processing and/or traffic transfer devices, such as a computer, a server (e.g., a proxy server, a cache server, etc.), a router, a bridge, a gateway, a modem, a firewall, a switch, a NIC, a hub, an OADM, or some other device capable of processing and/or transferring traffic. For example, intermediary devices 240/250 may include a caching appliance that stores content for delivery over CDN 295. Intermediary devices 240/250 may receive content requests and/or deliver content in response to a content request. Intermediary devices 240/250 may send traffic to and/or receive traffic from any of the devices and/or networks illustrated in environment 200, as well as other devices and/or networks (not illustrated).

Intermediary devices 240/250 may gather, process, search, store, and/or provide anycast content, such as an anycast stream (e.g., an anycast audio stream, an anycast video stream, an anycast audiovisual stream, etc.). Intermediary devices 240/250 may be associated with an anycast address, which may be a network address (e.g., anycast IP address 192.168.0.1, as illustrated). Mobile device 210 may request anycast content using an anycast address. The requested anycast content may be delivered by intermediary devices 240/250, depending on the service area in which mobile device 210 is located.

HA 260 may include one or more computation or communication devices that gather, process, search, store, and/or provide information in a manner described herein. HA 260 may include one or more data processing and/or traffic transfer devices, such as a computer, a server (e.g., a proxy server, a cache server, etc.), a router, a bridge, a gateway, a modem, a firewall, a switch, a NIC, a hub, an OADM, or some other device capable of processing and/or transferring traffic. HA 260 may send traffic to and/or receive traffic from any of the devices and/or networks illustrated in environment 200, as well as other devices and/or networks (not illustrated). HA 260 may service a particular service area, such as a home service area of mobile device 210. HA 260 may tunnel traffic for delivery to mobile device 210 when mobile device 210 is outside of the home region (e.g., via FAs 220/230). HA 260 may maintain location and/or service area information associated with a current location of mobile device 210. For example, HA 260 may keep track of which FA 220/230 is currently providing service to mobile device 210.

CDN service processor 270 may include one or more server devices, or other types of computation or communication devices, that gather, process, search, store, and/or provide information in a manner described herein. CDN service processor 270 may receive content requests and assign devices to deliver requested content. CDN service processor 270 may receive content requests, such as a request for anycast content, from mobile device 210 over CDN 295. CDN service processor 270 may assign an intermediary device 240/250 to deliver the requested content, based on a service area (e.g. a particular geographic region) of mobile device 210. CDN service processor 270 may assign content delivery to an intermediary device 240/250 that is closest to mobile device 210, and/or may assign content delivery to an intermediary device 240/250 that is able to most efficiently deliver content to mobile device 210.

CDN controller 280 may include one or more server devices, or other types of computation or communication devices, that gather, process, search, store, and/or provide information in a manner described herein. CDN controller 280 may gather, process, search, store, and/or provide information about anycast addresses associated with anycast streams. CDN controller 280 may send traffic to and/or receive traffic from any of the devices and/or networks illustrated in environment 200, as well as other devices and/or networks (not illustrated). For example, CDN controller 280 may send anycast address information to mobile device 210 and/or FAs 220/230.

In some implementations, CDN controller 280 may receive queries from FAs 220/230 that request information identifying active anycast addresses being used in a service area associated with the requesting FA 220/230. CDN controller 280 may send information identifying active anycast addresses associated with a particular FA 220/230 to the particular FA 220/230.

While shown as being integrated into and internal to CDN service processor 270, CDN controller 280 may be implemented separately from and external to CDN service processor 270.

Content provider 290 may include any type or form of content provider. For example, content provider 290 may include a website host (e.g., a provider of one or more websites, such as websites located at www.verizon.com, www.yahoo.com, www.nbc.com, etc.). Additionally, or alternatively, content provider 290 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., YouTube, Vimeo, Netflix, Hulu, Veoh, etc.) that stream content from web sites and/or permit content to be downloaded (e.g., via progressive download, etc.). Content provider 290 may include on-demand content providers (e.g., video on demand providers, pay per view providers, etc.).

CDN 295 may include one or more wired and/or wireless networks. For example, CDN 295 may include a cellular network, a public land mobile network ("PLMN"), a second generation (2G) network, a third generation (3G) network, a fourth generation (4G) network, a fifth generation (5G) network, and/or another network. Additionally, or alternatively, CDN 295 may include a wide area network ("WAN"), a metropolitan area network ("MAN"), a telephone network (e.g., the Public Switched Telephone Network ("PSTN")), an ad hoc network, an intranet, a fiber optic-based network (e.g., "FiOS"), and/or a combination of these or other types of networks.

Figure 3:
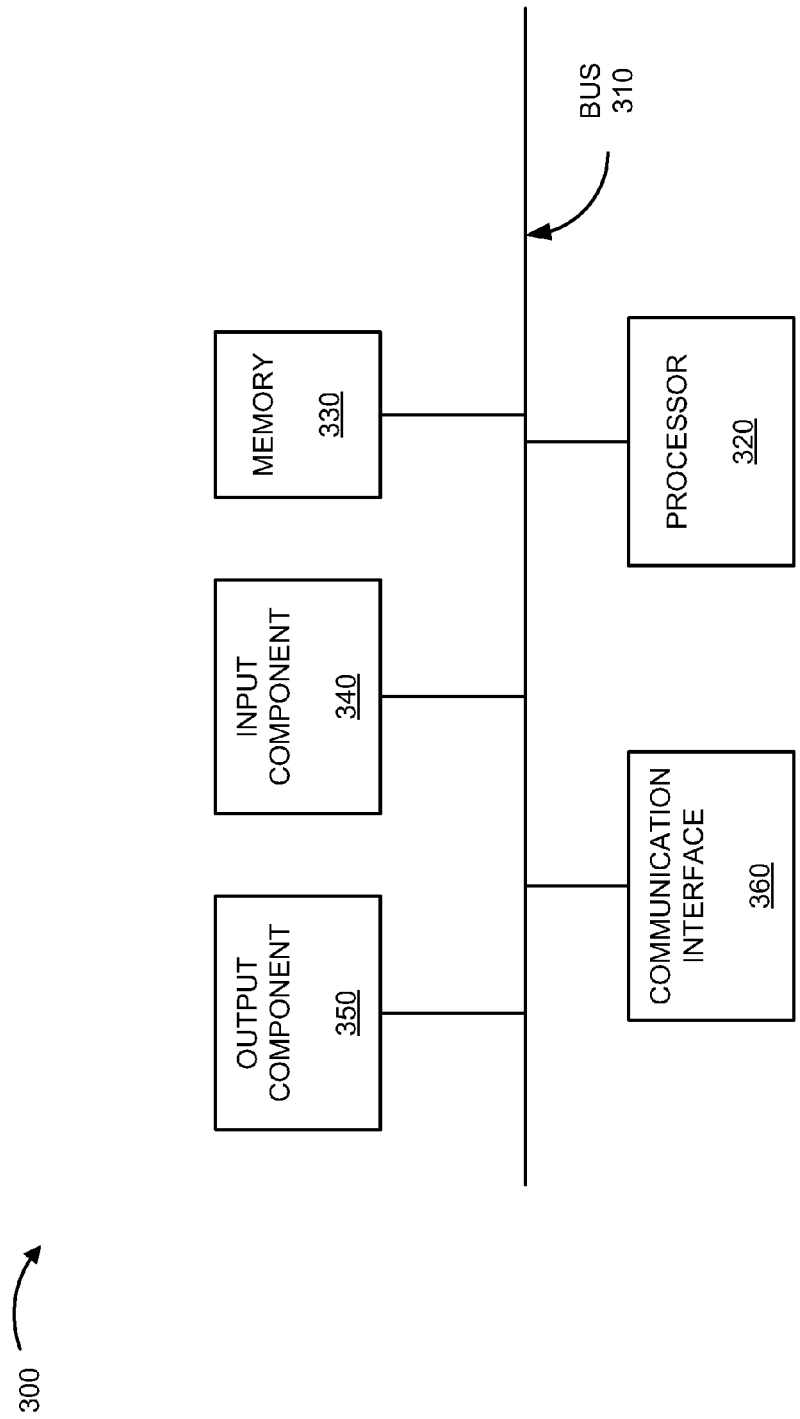
FIG. 3 is a diagram of example structural components of one or more devices of FIG. 2.

FIG. 3 is a diagram of example structural components of a device 300. Device 300 may correspond to mobile device 210, FAs 220/230, intermediary devices 240/250, HA 260, CDN service processor 270, CDN controller 280, and/or content provider 290. Additionally, or alternatively, each of mobile device 210, FAs 220/230, intermediary devices 240/250, HA 260, CDN service processor 270, CDN controller 280, and/or content provider 290 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than illustrated in FIG. 3.

Bus 310 may include a path that permits communication among the components of device 300. Processor 320 may include a processor, a microprocessor, and/or any processing logic (e.g., a field-programmable gate array (FPGA), an application-specific integrated circuit (ASIC), etc.) that may interpret and execute instructions. Memory 330 may include a random access memory (RAM), a read only memory (ROM), or any type of dynamic or static storage device (e.g., a flash, magnetic, or optical memory) that may store information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes (LEDs), etc.). Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network, such as CDN 295. Additionally, or alternatively, communication interface 360 may be a logical component that includes input and output ports, input and output systems, and/or other input and output components that facilitate the communication of data to and/or from other devices, such as an Ethernet interface, an optical interface, a coaxial interface, an infrared interface, a radio frequency (RF) interface, a USB interface, or the like.

As described herein, device 300 may perform certain operations relating to mobility management for anycast content delivery. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processed described herein. Thus, implementations described herein are not limited to any specific combination of hardware circuitry and software.

Figure 4:
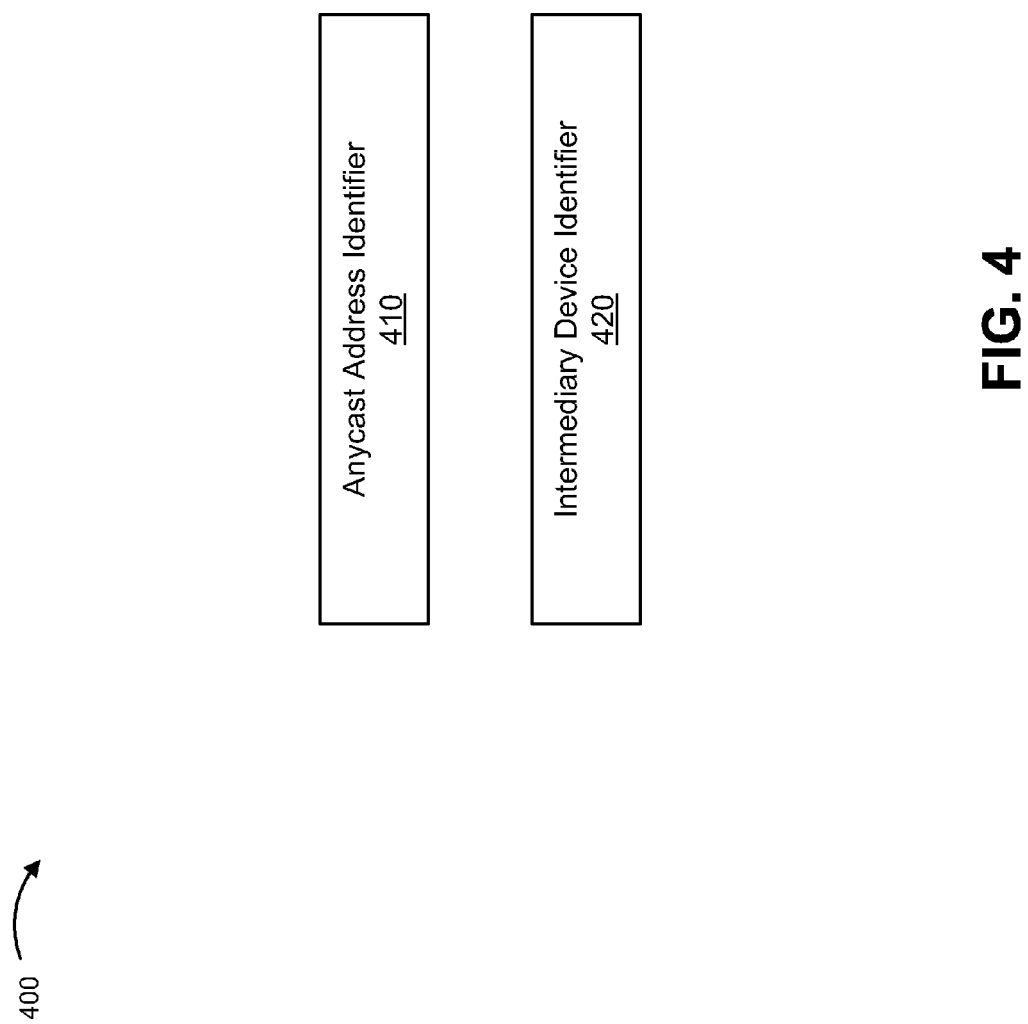
FIG. 4 is a diagram of example functional components of one or more devices of FIG. 2.

FIG. 4 is a diagram of example functional components of a device 400. In some implementations, device 400 may correspond to FAs 220/230. As illustrated, device 400 may include an anycast address identifier 410 and an intermediary device identifier 420. Each of functional components 410-420 may be implemented using one or more components shown in FIG. 3. FAs 220/230 may individually include all of the components depicted in FIG. 4, or the components depicted in FIG. 4 may be distributed singularly or duplicatively in any manner between the devices illustrated in FIG. 2. In some implementations, FAs 220/230 may include other functional components (not shown) that aid in mobility management for anycast content delivery.

Anycast address identifier 410 may receive and/or transmit anycast address data. Anycast address identifier 410 may identify one or more devices (e.g., CDN controller 280) that may be queried in order to gather anycast address data. Anycast address data may include information associated with an anycast stream, including an anycast address (e.g., a network address, an IP address, etc.) associated with an anycast stream, active anycast addresses (e.g., anycast addresses currently in use, anycast addresses scheduled to be used, etc.), a CDN provider that provides anycast content associated with anycast addresses, and/or a CDN controller 280 that monitors anycast addresses. Anycast address identifier 410 may query and/or receive information from another device on a periodic basis, so that a list of active anycast addresses is kept up-to-date. Anycast address identifier 410 may store the anycast address data.

Anycast address identifier 410 may identify active anycast addresses associated with a particular FA 220/230. Active anycast addresses may include an address that identifies an active anycast stream. Active anycast streams may include registered anycast streams, anycast streams that are being used, anycast streams associated with an anycast address that is being used, anycast streams that are being transmitted and/or received by a particular device (e.g., mobile device 210, FAs 220/230, intermediary devices 240/250), anycast streams that are actively being transmitted and/or received, and/or anycast streams that are expected to be transmitted and/or received during a particular time period. Additionally, or alternatively, anycast address identifier 410 may identify active anycast streams associated with a particular service area, routing domain, and/or FA 220/230. For example, anycast address identifier 410 may identify anycast stream being transmitted and/or received in a service area associated with a particular FA 220/230.

FIG. 5 is a diagram of an example data structure 500 that stores information associated with anycast addresses. Data structure 500 may be stored in a memory device (e.g., RAM, hard disk, etc.) associated with one or more components shown in FIGS. 2-4. For example, data structure 500 may be stored by mobile device 210, FAs 220/230, HA 260, CDN controller 280, memory 330, anycast address identifier 410, etc.

Data structure 500 may include a collection of fields, such as an anycast address field 510, a CDN provider identifier ("ID") field 520, a CDN controller ID field 530, and a time until next update field 540. Data structure 500 includes fields 510-540 for explanatory purposes. In practice, data structure 500 may include additional fields, fewer fields, different fields, or differently arranged fields than are described with respect to data structure 500.

Anycast address field 510 may store information that identifies an address associated with an anycast stream. For example, anycast address field 510 may store a network address (e.g., an IP address) from which anycast content can be accessed. The information stored in anycast address field 510 may be updated periodically so that only active anycast addresses are stored in data structure 500.

CDN provider ID field 520 may store information that identifies a CDN provider that provides anycast content associated with the anycast address identified by anycast address field 510. For example, information stored in CDN provider ID field 520 may include a name of a content provider providing anycast content, such as content provider 290.

CDN controller ID field 530 may store information that identifies a CDN controller 280 that monitors the anycast address identified by anycast address field 510. For example, information stored in CDN controller field 530 may include a network address (e.g., an IP address) and/or a host name of a CDN controller 280.

Time until next update field 540 may store information that indicates when the information associated with the anycast address identified by anycast address field 510 should be updated. For example, time until next update field 540 may indicate an amount of time remaining until anycast address identifier 410 sends a query to and/or receives information from another device (e.g., CDN controller 280) in order to update fields 510-530 of data structure 500.

Information for a single anycast address is conceptually represented as a row in data structure 500. For example, the first row in data structure 500 corresponds to an anycast address of "192.168.101.1," which has a CDN provider ID of "CDN Provider A," a CDN controller ID of "ccont1.cdnprovda.ny.net," and a time until next update of "43:33," corresponding to 43 minutes and 33 seconds. This row indicates that in 43 minutes and 33 seconds, anycast IP identifier 410 may send a query to and/or receive information from CDN controller 280 identified as "ccont1.cdnprovda.ny.net" in order to determine any active anycast addresses associated with this CDN controller 280, as well as the name of the CDN provider providing the content associated with those active anycast addresses.

Returning to FIG. 4, intermediary device identifier 420 may receive and/or transmit intermediary device data. In some implementations, intermediary device identifier 420 may query another device (e.g., intermediary devices 240/250) to request intermediary device data, and/or may receive intermediary device data from another device (e.g., intermediary devices 240/250). Intermediary device data may identify an intermediary device 240/250 associated with an anycast address, such as an active anycast address. Additionally, or alternatively, intermediary device data may identify an intermediary device 240/250 responsible for delivering a particular anycast stream in a particular service area and/or routing domain, such as a service area associated with a particular FA 220/230. Intermediary device identifier 420 may identify an intermediary device 240/250 by sending an identification query to an anycast address. Anycast routing may direct the query to the intermediary device 240/250 associated with the querying intermediary device identifier 420 (and, e.g., the querying FA 220/230).

Intermediary device identifier 420 may query and/or receive information from another device on a periodic basis, so that a list of intermediary devices 240/250 associated with active anycast addresses is kept up-to-date. Intermediary device identifier 420 may store the intermediary device data.

Figure 6:
FIG. 6 is a diagram of an example data structure that stores information associated with intermediary devices.

FIG. 6 is a diagram of an example data structure 600 that stores information associated with intermediary devices. Data structure 600 may be stored in a memory device (e.g., RAM, hard disk, etc.) associated with one or more components shown in FIGS. 2-4. For example, data structure 600 may be stored by mobile device 210, FAs 220/230, HA 260, CDN controller 280, memory 330, intermediary device identifier 420, etc.

Data structure 600 may include a collection of fields, such as a foreign agent ID field 610, an anycast address field 620, and an intermediary device ID field 630. Data structure 600 includes fields 610-630 for explanatory purposes. In practice, data structure 600 may include additional fields, fewer fields, different fields, or differently arranged fields than are described with respect to data structure 600.

Foreign agent ID field 610 may store information that identifies a foreign agent, such as FAs 220/230. FAs 220/230 may be identified in any manner, such as by an identification number, an indication of whether FA 220/230 is a DFA 220 or an AFA 230 for a particular mobile device 210, a host name, a network address, etc.

Anycast address field 620 may store information that identifies an address associated with an anycast stream, as described elsewhere herein with respect to FIG. 5 and anycast address field 510. Anycast address field 620 may store information identifying active anycast addresses that may be accessible via FA 220/230 identified by foreign agent ID field 610.

Intermediary device ID field 630 may store information that identifies an intermediary device (e.g., intermediary devices 240/250) responsible for processing, storing, transmitting, and/or delivering anycast content associated with the anycast address identified by anycast address field 620 via the FA 220/230 identified by foreign agent ID field 610. For example, information stored in intermediary device ID field 630 may include a network address and/or a host name of an intermediary device, such as intermediary devices 240/250.

Information for a single anycast address is conceptually represented as a row in data structure 600. For example, the first row in data structure 600 corresponds to a foreign agent ID of "DFA-1," an anycast address of "192.168.101.1," and an intermediary device ID of "intdev1.cdnprovda.nj.net." This row indicates that the intermediary device 240/250 associated with anycast address 192.168.101.1 is identified by intermediary device ID "intdev1.cdnprovda.nj.net" when mobile device 210 is receiving content routed through the FA 220/230 identified by the foreign agent ID of "DFA-1."

Different FAs 220/230 may have different intermediary devices 240/250 associated with the same anycast address. For example, the first row in data structure 600 indicates that DFA 220, identified as "DFA-1," utilizes the intermediary device 240/250 identified as "intdev1.cdnprovda.nj.net" to deliver the anycast stream associated with anycast address "192.168.101.1." The second row in data structure 600 indicates that AFA 230, identified as "AFA-1," utilizes a different intermediary device 240/250, identified as "intdev2.cdnprovda.nj.net," to deliver the anycast stream associated with the same anycast address of "192.168.101.1."

Figure 7:
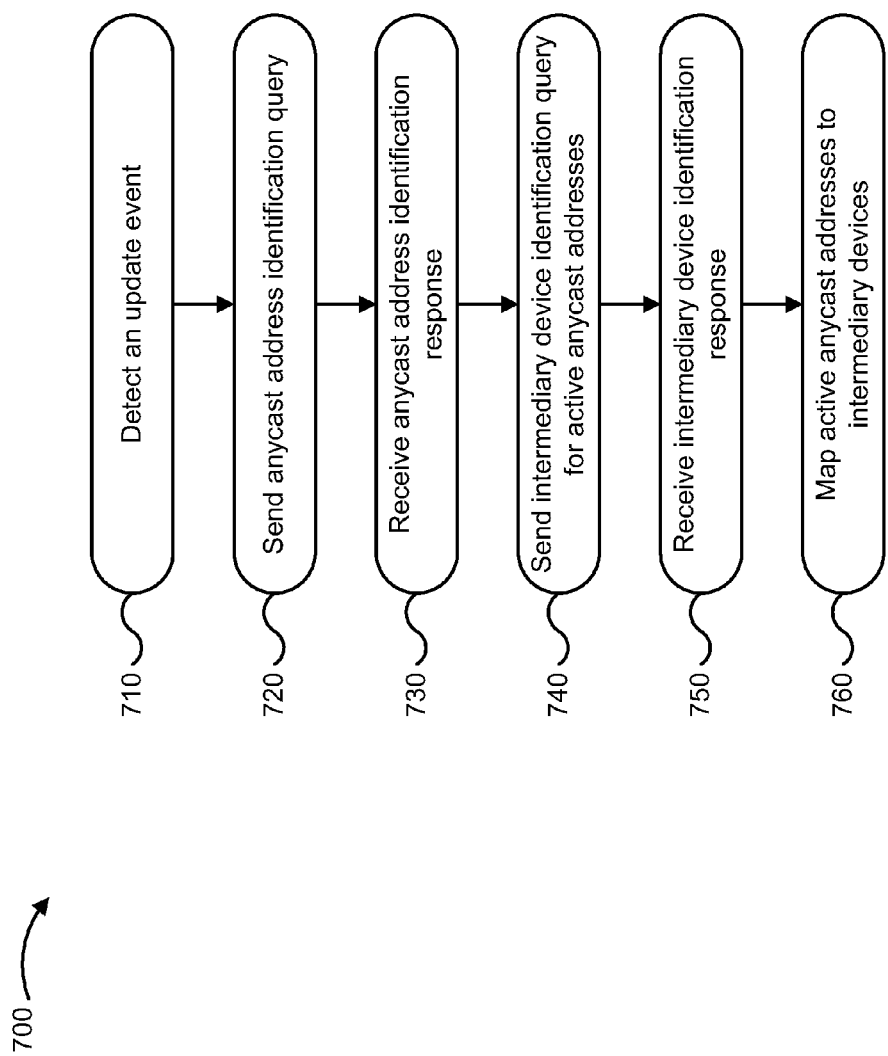
FIG. 7 is a diagram of an example process for mapping anycast addresses to intermediary devices.

FIG. 7 is a diagram of an example process 700 for mapping anycast addresses to intermediary devices. In some implementations, one or more of the process blocks of FIG. 7 may be performed by one or more components of FAs 220/230, and/or another device, such as mobile device 210, HA 260, CDN service processor 270, CDN controller 280, etc.

Process 700 may include detecting an update event (block 710). In some implementations, anycast address identifier 410 may detect an update event. For example, anycast address identifier 410 may determine that a particular period of time has passed since the memory (e.g., data structure 500 and/or data structure 600), which stores information associated with anycast addresses and/or intermediary devices, has been updated. The particular period of time may be associated with information stored in a memory, such as the time until the next update stored in next update field 540 of data structure 500.

Process 700 may include sending an anycast address identification query (block 720). In some implementations, anycast address identifier 410 may send an anycast address identification query to another device, such as CDN service processor 270, CDN controller 280, etc. The anycast address identification query may request a list of active anycast addresses, such as active anycast addresses associated with one or more CDN controllers 280 and/or FAs 220/230.

Process 700 may include receiving an anycast address identification response (block 730). In some implementations, anycast address identifier 410 may receive an anycast address identification response from another device, such as CDN service processor 270, CDN controller 280, etc. The anycast address identification response may include a list of active anycast addresses, such as active anycast addresses associated with one or more CDN controllers 280 and/or FAs 220/230.

Process 700 may include sending an intermediary device identification query for active anycast addresses (block 740). In some implementations, intermediary device identifier 420 may send an intermediary device identification query to another device, such as intermediary devices 240/250. Additionally, or alternatively, intermediary device identifier 420 may send the query to any device identified by the anycast address, requesting identification of the device. Intermediary device identifier 420 may send an intermediary device identification query for each active anycast address.

Process 700 may include receiving an intermediary device identification response (block 750). In some implementations, intermediary device identifier 420 may receive an intermediary device identification response from another device, such as intermediary devices 240/250. Additionally, or alternatively, intermediary device identifier 420 may receive the response from any device identified by the anycast address, and the response may identify the device. Intermediary device identifier 420 may receive an intermediary device identification response for each active anycast address.

Process 700 may include mapping active anycast addresses to intermediary devices (block 760). In some implementations, intermediary device identifier 420 may map each active anycast address to an intermediary device 240/250 responsible for delivering the anycast stream associated with the anycast address (e.g., intermediary devices 240/250). The intermediary device 240/250 may be different for different FAs 220/230. For example, DID 240 may be associated with DFAs 220, and AID 250 may be associated with AFAs 230. In some implementations, intermediary device identifier 420 may map each FA 220/230 in a particular service area to the particular intermediary devices 240/250 responsible for delivering a particular anycast stream in that particular service area.

Figure 8:
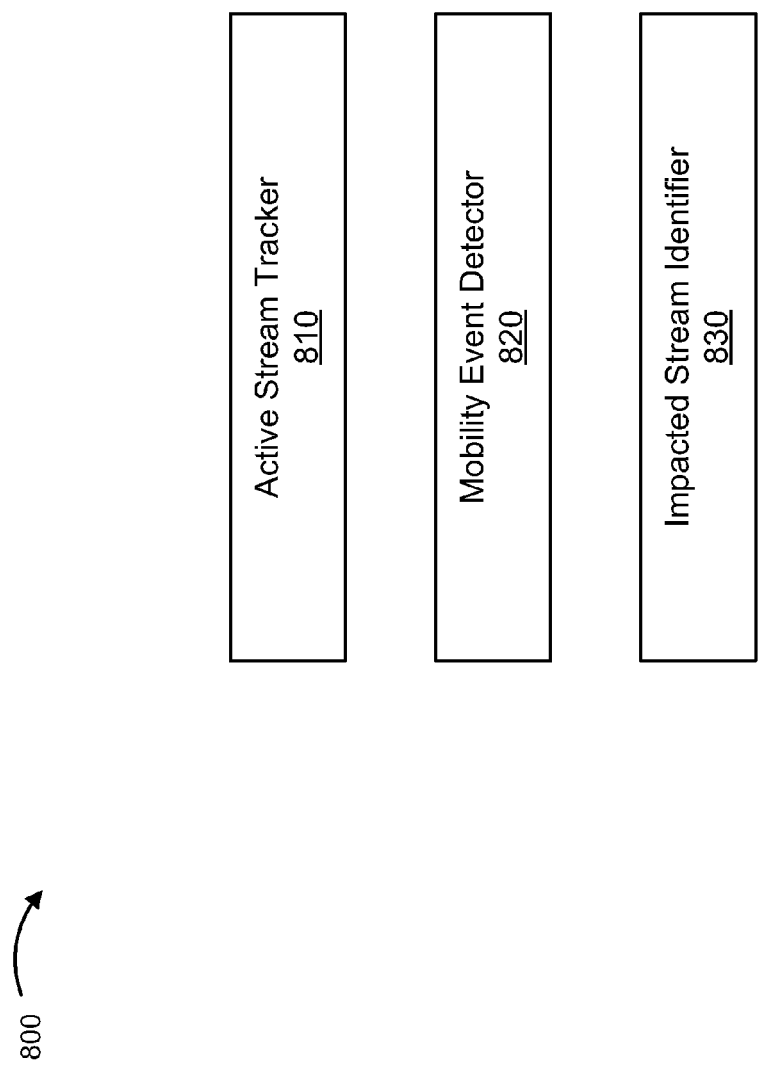
FIG. 8 is a diagram of example functional components of one or more devices of FIG. 2.

FIG. 8 is a diagram of example functional components of a device 800. In some implementations, device 800 may correspond to mobile device 210. As illustrated, device 800 may include an active stream tracker 810, a mobility event detector 820, and an impacted stream identifier 830. Each of functional components 810-830 may be implemented using one or more components shown in FIG. 3. Mobile device 210 may individually include all of the components depicted in FIG. 8, or the components depicted in FIG. 8 may be distributed singularly or duplicatively in any manner between the devices illustrated in FIG. 2. In some implementations, mobile device 210 may include other functional components (not shown) that aid in mobility management for anycast content delivery.

Active stream tracker 810 may track active anycast streams associated with mobile device 210. Active stream tracker 810 may receive stream ID data that identifies a particular anycast stream. Stream ID data may identify a port receiving the anycast stream on mobile device 210, a port transmitting the anycast stream from a device in the content delivery network, a network address of mobile device 210 receiving the anycast stream, a network address of a device in the content delivery network transmitting the anycast stream, and/or any combination of source and/or destination network addresses, ports, and/or other fields in a packet hearder that may be used to identify an anycast stream.

Figure 9:
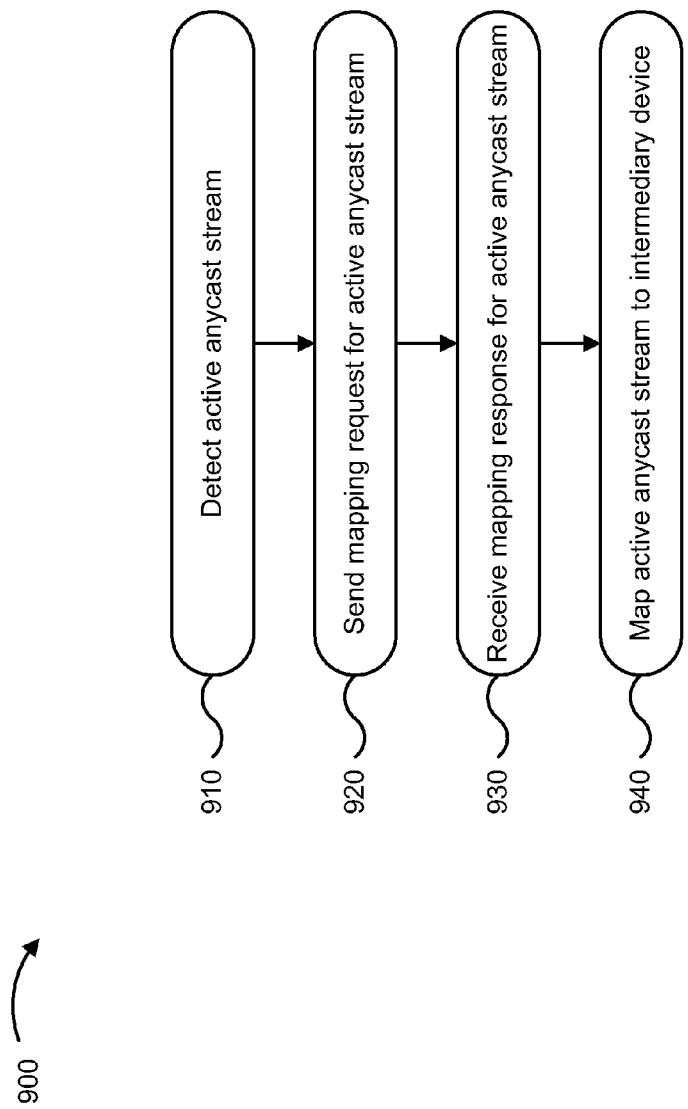
FIG. 9 is a diagram of an example process for mapping active anycast streams to intermediary devices responsible for delivering the active anycast streams.

FIG. 9 is a diagram of an example process 900 for mapping active anycast streams to intermediary devices responsible for delivering the active anycast streams. In some implementations, one or more of the process blocks of FIG. 9 may be performed by one or more components of mobile device 210 and/or another device, such as FAs 220/230, HA 260, CDN service processor 270, CDN controller 280, etc.

Process 900 may include detecting an active anycast stream (block 910). In some implementations, active stream tracker 810 may detect an anycast stream that is being received by mobile device 210. Active stream tracker 810 may automatically detect that a new anycast stream is being received, and/or active stream tracker 810 may periodically check to determine whether a new anycast stream is being received.

Process 900 may include sending a mapping request for an active anycast stream (block 920). In some implementations, active stream tracker 810 may send a request to map an active anycast stream to an intermediary device 240/250. In some implementations, active stream tracker 810 may send the mapping request to another component and/or device, such as intermediary device identifier 420 and/or FAs 220/230. Intermediary device identifier 420 and/or FAs 220/230 may consult a memory (e.g., data structure 600) to determine the intermediary device 240/250 associated with the active anycast stream. Additionally, or alternatively, intermediary device identifier 420 and/or FAs 220/230 may initiate a process to map the active anycast stream to an intermediary device 240/250 (e.g., via process 700). Additionally, or alternatively, active stream tracker 810 may directly consult a memory (e.g., data structure 600) to determine an intermediary device 240/250 that corresponds to the active anycast stream.

Process 900 may include receiving a mapping response for an active anycast stream (block 930). In some implementations, active stream tracker 810 may receive a mapping response that identifies an intermediary device 240/250 responsible for delivering the active anycast stream. In some implementations, active stream tracker 810 may receive the mapping response from another component and/or device, such as intermediary device identifier 420 and/or FAs 220/230, as described above with respect to block 920.

Process 900 may include mapping an active anycast stream to an intermediary device (block 940). In some implementations, active stream tracker 810 may update a mapping memory with information identifying active anycast streams and their associated intermediary devices 240/250 (e.g., using an intermediary device ID). In addition to adding active anycast streams to the mapping memory, active stream tracker 810 may remove inactive anycast streams from the mapping memory. Active stream tracker 810 may automatically detect that an anycast stream is no longer being received, and/or active stream tracker 810 may periodically check to determine whether an anycast stream is no longer being received.

Figure 10:
FIG. 10 is a diagram of an example data structure that stores information associated with active anycast streams.

FIG. 10 is a diagram of an example data structure 1000 that stores information associated with active anycast streams. Data structure 1000 may be stored in a memory device (e.g., RAM, hard disk, etc.) associated with one or more components shown in FIGS. 2-4. For example, data structure 1000 may be stored by mobile device 210, FAs 220/230, HA 260, CDN controller 280, etc.

Data structure 1000 may include a collection of fields, such as a stream number field 1010, a stream ID data field 1020, an anycast address field 1030, and an intermediary device ID field 1040. Data structure 1000 includes fields 1010-1040 for explanatory purposes. In practice, data structure 1000 may include additional fields, fewer fields, different fields, or differently arranged fields than are described with respect to data structure 1000.

Stream identifier field 1010 may store information that identifies an active anycast stream. For example, stream number field may store a character string used to identify an active anycast stream.

Stream ID data field 1020 may store source and/or destination information associated with the active anycast stream identified by the stream identifier in stream identifier field 1010. For example, stream ID data field 1020 may store information that identifies a port receiving the active anycast stream on mobile device 210 ("MD Port"), a port transmitting the active anycast stream from a device in the content delivery network ("CDN Port"), a network address of mobile device 210 receiving the active anycast stream ("MD IP"), a network address of a device in the content delivery network transmitting the active anycast stream ("CDN IP"), and/or any combination of source and/or destination network addresses, ports, and/or other fields in a packet header that may be used to identify an active anycast stream.

Anycast address field 1030 may store information that identifies an address associated with an anycast stream, as described elsewhere herein with respect to FIG. 5 and anycast address field 510. For example, anycast address field 1030 may store information identifying a network address for the intermediary device 240/250 associated with the active anycast stream identified by the stream identifier in stream identifier field 1010.

Intermediary device ID field 1040 may store information that identifies an intermediary device 240/250 that aids in delivering the active anycast stream identified by the stream identifier in stream identifier field 1010. For example, intermediary device ID field 1040 may store a host name and/or network address of an intermediary device 240/250.

Information for a single active anycast stream is conceptually represented as a row in data structure 1000. For example, the first row in data structure 1000 corresponds to an active anycast stream with a stream identifier of "00191," stream ID data of "MD Port=23001, CDN Port=80, MD IP=12.12.12.12, CDN IP=192.168.101.1," an anycast address of "192.168.101.1," and an intermediary device ID of "intdev1.cdnprovda.nj.net." This row indicates that the active anycast stream identified by anycast address 192.168.101.1, MD Port 23001, CDN Port 80, MD IP 12.12.12.12, and CDN IP 192.168.101.1, has been given a stream identifier of 00191, and is associated with an intermediary device 240/250 with a host name of "intdev1.cdnprovda.nj.net."

Returning to FIG. 8, mobility event detector 820 may detect mobility events. A mobility event may be a pending and/or completed transition by mobile device 210 from one service area (e.g., serviced by DFAs 220 and DID 240) to another service area (e.g., serviced by AFAs 230 and AID 250). In some implementations, mobility event detector 820 may detect a mobility event when mobile device 210 approaches, meets, and/or passes a border between two service areas. Additionally, or alternatively, mobility event detector 820 may detect the presence of a neighboring service area. In some implementations, mobility event detector 820 may detect mobility events using a physical layer of a device and/or an IP layer of a device.

Mobility event detector 820 may detect devices associated with a mobility event, such as FAs 220/230 and/or intermediary devices 240/250. In some implementations, mobility event detector 820 may detect a mobility event by detecting signals associated with more than one FA 220/230, more than one intermediary device 240/250, and/or more than one wireless network base station.

In some implementations, mobility event detector 820 may detect a mobility event when mobile device 210 is about to or has already switched from one wireless network technology type to another wireless network technology type. Wireless network technology types may include Wi-Fi, Worldwide Interoperability for Microwave Access ("WiMAX"), 2G technology, 3G technology, 4G technology, 5G technology, Long Term Evolution ("LTE") technology, etc.

In some implementations, mobility event detector 820 may detect a mobility event based on protocols supporting mobility management. For example, mobility event detector 820 may detect a Mobile IP registration request and/or a Mobile IP registration response.

Impacted stream identifier 830 may identify active anycast streams that are impacted by a mobility event. Impacted stream identifier 830 may identify an FA 220/230, and/or an intermediary device 240/250 associated with a mobility event and an active anycast stream. Impacted stream identifier 830 may compare the intermediary device 240/250 associated with an active anycast stream in the departure service area (e.g., DID 240) to the intermediary device 240/250 associated with an active anycast stream in the arrival service area (e.g., AID 250). Impacted stream identifier 830 may determine that the active anycast stream is impacted by the mobility event when the intermediary devices 240/250 associated with the active anycast stream in the departure service area and the intermediary devices 240/250 associated with the active anycast stream in the arrival service area are different.

FIG. 11 is a diagram of an example data structure 1100 that stores information associated with anycast streams impacted by a mobility event. Data structure 1100 may be stored in a memory device (e.g., RAM, hard disk, etc.) associated with one or more components shown in FIGS. 2-4. For example, data structure 1100 may be stored by mobile device 210, FAs 220/230, HA 260, CDN controller 280, etc.

Data structure 1100 may include a collection of fields, such as a stream number field 1110, an anycast address field 1120, a departure intermediary device ID field 1130, an arrival intermediary device ID field 1140, and an impacted stream indicator field 1150. Data structure 1100 includes fields 1110-1150 for explanatory purposes. In practice, data structure 1100 may include additional fields, fewer fields, different fields, or differently arranged fields than are described with respect to data structure 1100.

Stream identifier field 1110 may store information that identifies an active anycast stream. For example, stream identifier field may store a character string used to identify an active anycast stream.

Anycast address field 1120 may store information that identifies an address associated with an anycast stream, as described elsewhere herein with respect to FIG. 5 and anycast address field 510. For example, anycast address field 1120 may store information identifying a network address for the intermediary device 240/250 associated with the active anycast stream identified by the stream identifier in stream identifier field 1110.

Departure intermediary device ID field 1130 (hereinafter, "DID ID field 1130") may store information that identifies an intermediary device 240/250 in the departure service area responsible for delivering the active anycast stream identified by the stream identifier in stream identifier field 1110. For example, DID ID field 1130 may store a host name and/or network address of a departure intermediary device (e.g., DID 240).

Arrival intermediary device ID field 1140 (hereinafter, "AID ID field 1140") may store information that identifies an intermediary device 240/250 in the arrival service area responsible for delivering the active anycast stream identified by the stream identifier in stream identifier field 1110. For example, AID ID field 1140 may store a host name and/or network address of an arrival intermediary device (e.g., AID 250).

Impacted stream indicator field 1150 may store information that indicates whether the active anycast stream identified by the stream identifier in stream identifier field 1110 is impacted by a mobility event. The impact of a mobility event on an active anycast stream may be determined by comparing the DID ID in field 1130 to the AID ID in field 1140 for a particular stream. If the DID ID in field 1130 is the same as the AID ID in field 1140 for a particular stream, then that particular stream is not impacted by the mobility event. However, if the DID ID in field 1130 is different from the AID ID in field 1140 for a particular stream, then that particular stream is impacted by the mobility event.

Information for a single active anycast stream is conceptually represented as a row in data structure 1100. For example, the first row in data structure 1100 corresponds to an active anycast stream with a stream identifier of "00191," an anycast address of "192.168.101.1," a DID ID of "intdev1.cdnprovda.nj.net," an AID ID of "intdev2.cdnprovda.nj.net," and an impacted stream indicator of "YES." This row indicates that the active anycast stream identified by stream identifier 00191 and anycast address 192.168.101.1 is delivered in the departure service area by DID 240 identified as "intdev1.cdnprovda.nj.net," and is delivered in the arrival service area by AID 250 identified as "intdev2.cdnprovda.nj.net." Stream 00191 is an impacted stream with an impacted stream indicator of "YES" because DID 240 is different from AID 250 for stream 00191.

Figure 12:
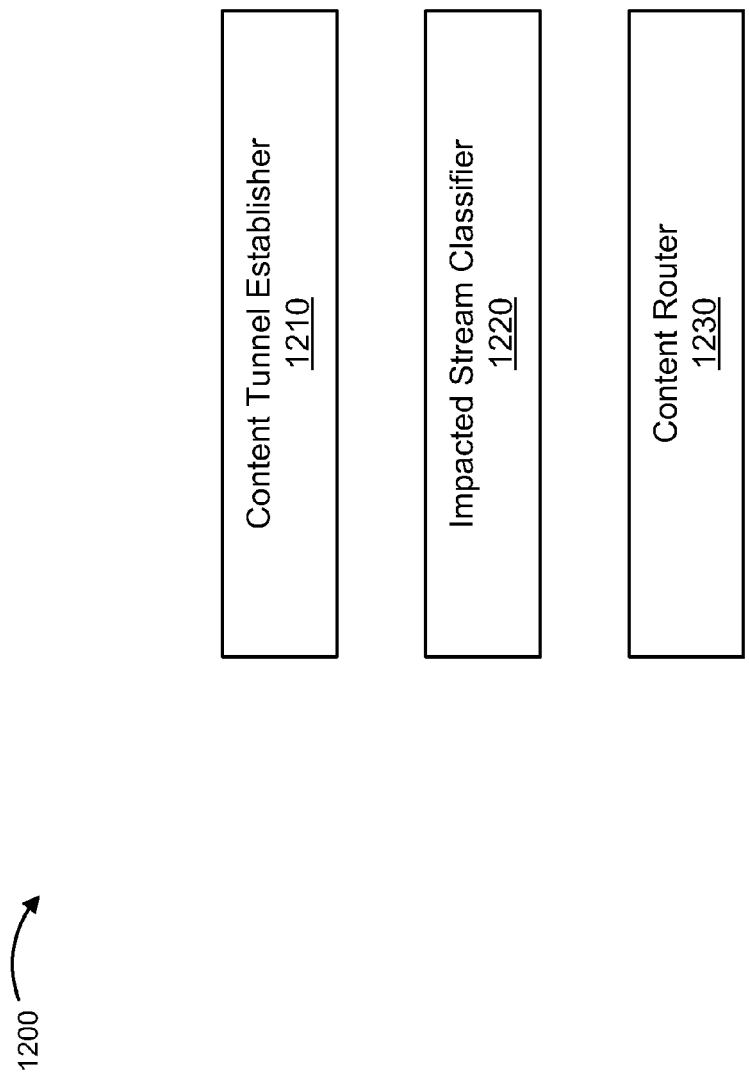
FIG. 12 is a diagram of example functional components of one or more devices of FIG. 2.

FIG. 12 is a diagram of example functional components of a device 1200. In some implementations, device 1200 may correspond to FAs 220/230. As illustrated, device 1200 may include a content tunnel establisher 1210, an impacted stream classifier 1220, and a content router 1230. Each of functional components 1210-1230 may be implemented using one or more components shown in FIG. 3. FAs 220/230 may individually include all of the components depicted in FIG. 12, or the components depicted in FIG. 12 may be distributed singularly or duplicatively in any manner between the devices illustrated in FIG. 2. In some implementations, FAs 220/230 may include other functional components (not shown) that aid in mobility management for anycast content delivery.

Content tunnel establisher 1210 may establish a content tunnel between DFA 220 and AFA 230 that aids in delivering anycast streams to mobile device 210 when mobile device 210 departs a service area associated with DFA 220 and arrives at a service area associated with AFA 230. Content tunnel establisher 1210 may use the content tunnel to aid in delivering anycast streams impacted by the movement of mobile device 210. For example, the content tunnel may be used to route communications (e.g., packets) associated with an impacted stream from mobile device 210 to DFA 220 and/or from DFA 220 to mobile device 210.

Content tunnel establisher 1210 may use any tunneling protocol to establish a tunnel for routing impacted streams, including Generic Routing Encapsulation (GRE), IP in IP, Multiprotocol Label Switching (MPLS), and/or Layer 2 Tunneling Protocol (L2TP). Content tunnel establisher 1210 may create a content tunnel in advance of a detected mobility event and/or may create a content tunnel as the content tunnel is needed (e.g., in response to detecting a mobility event).

Content tunnel establisher 1210 may determine whether an existing content tunnel is adequate for transporting an active anycast stream between two FAs 220/230. If content tunnel establisher 1210 determines that an existing content tunnel is adequate for transporting an active anycast stream, then content tunnel establisher 1210 may direct the active anycast stream over the content tunnel. If content tunnel establisher 1210 determines that an existing content tunnel is not adequate for transporting an active anycast stream, then content tunnel establisher 1210 may create a new content tunnel to transport the active anycast stream. Content tunnel establisher 1210 may also terminate idle tunnels (e.g., tunnels that have not been used to transport content for a particular period of time).

In some implementations, content tunnel establisher 1210 may establish multiple content tunnels to connect two particular foreign agents, such as DFA 220 and AFA 230. For example, content tunnel establisher 1210 may establish multiple content tunnels to transport multiple anycast streams between DFA 220 and AFA 230. In other implementations, content tunnel establisher 1210 may establish a tunnel that can transport multiple anycast streams between DFA 220 and AFA 230.

In some implementations, content tunnel establisher 1210 may establish a series of content tunnels between three or more foreign agents. For example, mobile device 210 may move from a first service area serviced by DFA 220 to a second service area serviced by an intermediate foreign agent ("IFA"), and then to a third service area serviced by AFA 230. In this example scenario, content tunnel establisher 1210 may establish a first content tunnel connecting DFA 220 to IFA, and may establish a second content tunnel connecting IFA to AFA 230. Content may be routed through the first content tunnel and the second content tunnel in order to transport content from DFA 220 to AFA 230.

In another implementation based on the above scenario, content tunnel establisher 1210 may establish a content tunnel between DFA 220 and IFA. Content may be routed from DFA 220 to IFA when mobile device 220 is in the second service area serviced by IFA. When mobile device 220 moves to the third service area serviced by AFA 230, content tunnel establisher 230 may create a content tunnel directly connecting DFA 220 to AFA 230, rather than routing content through two content tunnels and IFA. In this scenario, content tunnel establisher 1210 may terminate the content tunnel between DFA 220 and IFA.

Impacted stream classifier 1220 may classify impacted streams to aid in selecting the proper content tunnel over which to transport the impacted streams. Impacted stream classifier 1220 may classify impacted streams according to classification parameters, which may include a network address for a stream source (e.g., a source IP address), a network address for a stream destination (e.g., a destination IP address), an IP precedence value (e.g., Differentiated Service Code Point, or DSCP), an application type of the stream (e.g., audio, video, audiovisual, game, productivity, sports, etc.), and/or a mobile home network address (e.g, a mobile home IP address). Impacted stream classifier 1220 may determine whether a particular stream meets a set of one or more classification parameters in order to classify streams.

Content router 1230 may route content over a content tunnel. For example, content router 1230 may route communications (e.g., packets) associated with an impacted stream from mobile device 210 to DFA 220 and/or from DFA 220 to mobile device 210. In some implementations, content router 1230 may select a content tunnel through which to route classified streams based on the classification parameters used to classify the streams. Content router 1230 may route content over a single content tunnel and/or multiple content tunnels.

FIG. 13 is a diagram of an example process 1300 for routing anycast streams impacted by a mobility event. In some implementations, one or more of the process blocks of FIG. 13 may be performed by one or more components of mobile device 210, FAs 220/230, and/or another device, such as HA 260, CDN service processor 270, CDN controller 280, etc.

Process 1300 may include detecting a mobility event (block 1310). In some implementations, mobility event detector 820 may detect a mobility event, as described elsewhere herein. Mobility event detector 820 may detect whether the mobility event is pending or completed. Additionally, or alternatively, mobility event detector 820 may identify an FA 220/230 in the departure service area (e.g., DFA 220), an FA 220/230 in the arrival service area (e.g., AFA 230), a mobile device 210 associated with the mobility event, an active anycast stream on the mobile device 210, an intermediary device 240/250 responsible for delivering the active anycast stream in the departure service area (e.g., DID 240), and/or an intermediary device 240/250 responsible for delivering the active anycast stream in the arrival service area (e.g., AID 250).

Process 1300 may include mapping active anycast streams to intermediary devices responsible for delivering the active anycast streams in the arrival service area (block 1320). In some implementations, impacted stream identifier 830 may map active anycast streams to intermediary devices 240/250 responsible for delivering the active anycast streams in the arrival service area (e.g., AID 250), as described elsewhere herein.

Process 1300 may include, for each active anycast stream, comparing the intermediary device responsible for delivering the active anycast stream in the departure service area (e.g., DID 240) with the intermediary device responsible for delivering the active anycast stream in the arrival service area (e.g., AID 250) (block 1330). In some implementations, impacted stream identifier 830 may perform this comparison, as described elsewhere herein.

Process 1300 may include determining impacted streams (block 1340). In some implementations, impacted stream identifier 830 may determine impacted streams, as described elsewhere herein. Impacted stream identifier 830 may determine that an active anycast stream is an impacted stream if the intermediary device 240/250 responsible for delivering the active anycast stream in the departure service area (e.g., DID 240) is different from the intermediary device 240/250 responsible for delivering the active anycast stream in the arrival service area (e.g., AID 250).

Process 1300 may include classifying impacted streams (block 1350). In some implementations, impacted stream classifier 1220 may classify impacted streams, as described elsewhere herein. For example, impacted stream classifier 1220 may classify impacted streams based on a network address of the stream destination.

Process 1300 may include establishing a content tunnel (block 1360). In some implementations, content tunnel establisher 1210 may establish a content tunnel to deliver impacted streams from AFA 230 to DFA 220 and/or from DFA 220 to AFA 230. For example, content tunnel establisher 1210 may establish a content tunnel to deliver impacted streams classified based on a network address of the stream destination.

Process 1300 may include routing impacted streams over a content tunnel according to a classification (block 1370). In some implementations, content router 1230 may route different anycast streams over different content tunnels based on classification parameters of the anycast stream.

FIG. 14 is a diagram of an example activity flow 1400 for pending mobility events. A pending mobility event may include a mobility event in which mobile device 210 is transmitting traffic to and/or receiving traffic from DFA 220 in the service area that mobile device 210 is departing. Additionally, or alternatively, a pending mobility event may include a mobility event in which mobile device 210 is not yet transmitting traffic to and/or receiving traffic from AFA 230 in the service area that mobile device 210 is entering.

While activity flow 1400 is shown as occurring between certain devices (mobile device 210, DFA 220, and AFA 230), these devices are shown for example purposes. In practice, activity flow 1400 may occur between additional devices, fewer devices, different devices, or differently arranged devices than are illustrated in FIG. 14. Furthermore, two or more of the devices illustrated in FIG. 14 may be implemented within a single device, or a single device may be implemented as multiple, distributed devices. Additionally, one or more of the devices illustrated in FIG. 14 may perform one or more functions and/or activities described as being performed by another one or more of the devices of FIG. 14.

Activity flow 1400 may include transmitting and/or receiving a pending mobility event notification (item 1410). In some implementations, mobile device 210 may notify DFA 220 of a pending mobility event. The pending mobility event notification may include an identification of an AFA 230 associated with the mobility event, an identification of active anycast streams associated with mobile device 210, and/or an identification of DIDs 240 associated with the active anycast streams.

Activity flow 1400 may include transmitting and/or receiving an intermediary device mapping request (item 1420). In some implementations, DFA 220 may request that AFA 230 send DFA 220 a list of AIDs 250 responsible for providing the active anycast streams associated with mobile device 210.

Activity flow 1400 may include transmitting and/or receiving an intermediary device mapping response (item 1430). In some implementations, AFA 230 may send DFA 220 a list of AIDs 250 responsible for providing the active anycast streams associated with mobile device 210.

Activity flow 1400 may include transmitting and/or receiving a mobility event response (item 1440). In some implementations, DFA 220 may transmit a mobility event response to mobile device 210. The mobility event response may include an identification of AIDs 250 responsible for providing the active anycast streams associated with mobile device 210.

Activity flow 1400 may include comparing a DID ID to an AID ID for each active anycast stream (item 1450). In some implementations, mobile device 210 may compare the received identification of AID 250 responsible for providing an active anycast stream with a stored identification of a DID 240 that provides the active anycast stream (e.g., information stored in data structure 1000 and/or 1100).

Activity flow 1400 may include determining impacted streams (item 1460). In some implementations, mobile device 210 may use a result of the DID-to-AID comparison to determine impacted streams, as described elsewhere herein.

Activity flow 1400 may include sending a transport service request (item 1470). In some implementations, mobile device 210 may notify DFA 220 of impacted streams, and may request that a content tunnel be established for the impacted streams.

Activity flow 1400 may include establishing a content tunnel (item 1480). In some implementations, DFA 220 may establish a content tunnel between DFA 220 and AFA 230 in order to transport communications associated with impacted streams from mobile device 210 to DID 240 by way of AFA 230, the content tunnel, and DFA 220. Additionally, or alternatively, the established content tunnel may transport communications associated with impacted streams from DID 240 to mobile device 210 by way of DFA 220, the content tunnel, and AFA 230.

FIG. 15 is a diagram of an example activity flow 1500 for completed mobility events. A completed mobility event may include a mobility event in which mobile device 210 is transmitting traffic to and/or receiving traffic from AFA 230 in the service area that mobile device 210 is entering. Additionally, or alternatively, a pending mobility event may include a mobility event in which mobile device 210 is no longer transmitting traffic to and/or receiving traffic from DFA 220 in the service area that mobile device 210 is departing.

While activity flow 1500 is shown as occurring between certain devices (mobile device 210, DFA 220, and AFA 230), these devices are shown for example purposes. In practice, activity flow 1500 may occur between additional devices, fewer devices, different devices, or differently arranged devices than are illustrated in FIG. 15. Furthermore, two or more of the devices illustrated in FIG. 15 may be implemented within a single device, or a single device may be implemented as multiple, distributed devices. Additionally, one or more of the devices illustrated in FIG. 15 may perform one or more functions and/or activities described as being performed by another one or more of the devices of FIG. 15.

Activity flow 1500 may include transmitting and/or receiving a completed mobility event notification (item 1510). In some implementations, mobile device 210 may notify AFA 230 of a completed mobility event. The completed mobility event notification may include an identification of a DFA 220 associated with the mobility event, an identification of active anycast streams associated with mobile device 210, and/or an identification of DIDs 240 associated with the active anycast streams.

Activity flow 1500 may include transmitting and/or receiving a mobility event response (item 1520). In some implementations, AFA 230 may transmit a mobility event response to mobile device 210. The mobility event response may include an identification of AIDs 250 responsible for providing the active anycast streams associated with mobile device 210.

Activity flow 1500 may include comparing a DID ID to an AID ID for each active anycast stream (item 1530). In some implementations, mobile device 210 may compare the received identification of AID 250 responsible for providing an active anycast stream with a stored identification of a DID 240 that provides the active anycast stream (e.g., information stored in data structure 1000 and/or 1100).

Activity flow 1500 may include determining impacted streams (item 1540). In some implementations, mobile device 210 may use a result of the DID-to-AID comparison to determine impacted streams, as described elsewhere herein.

Activity flow 1500 may include sending a transport service request (item 1550). In some implementations, mobile device 210 may notify AFA 230 of impacted streams, and may request that a content tunnel be established for the impacted streams.

Activity flow 1500 may include establishing a content tunnel (item 1560). In some implementations, AFA 230 may establish a content tunnel between DFA 220 and AFA 230 in order to transport communications associated with impacted streams from mobile device 210 to DID 240 by way of AFA 230, the content tunnel, and DFA 220. Additionally, or alternatively, the established content tunnel may transport communications associated with impacted streams from DID 240 to mobile device 210 by way of DFA 220, the content tunnel, and AFA 230.

Implementations described herein may prevent service disruptions of anycast streams due to mobile device mobility. Implementations described herein may prevent such service disruptions by establishing a content tunnel between foreign agents so as to maintain a route to, from, and/or through an intermediary device when a mobile device leaves a service area associated with the intermediary device.

The foregoing disclosure provides illustration and description, but is not intended to be exhaustive or to limit the embodiments to the precise form disclosed. Modifications and variations are possible in light of the above disclosure or may be acquired from practice of the embodiments.

While series of blocks have been described with regard to FIGS. 7, 9, and 13, the order of the blocks may be modified in some implementations. Further, non-dependent blocks may be performed in parallel.

While series of activities have been described with regard to FIGS. 14 and 15, the order of the activities may be modified in some implementations. Further, non-dependent activities may be performed in parallel.

Certain data structures have been presented with regard to FIGS. 5, 6, 10, and 11. These data structures are purely examples and merely serve to facilitate the description of the storage of information associated with anycast streams. When storing information in virtual memory, one or more fields of the data structures in these figures may be stored in virtual memory. Likewise, when storing information in physical memory, one or more fields of the data structures in these figures may be stored in physical memory. Although some data structures have been illustrated as separate, the data structures may be combined into a single data structure. Likewise, data fields illustrated as being part of a single data structure may be separated into multiple, distributed data structures.

While the data structures presented with regard to FIGS. 5, 6, 10, and 11 are represented as tables with rows and columns, in practice, the data structures may include any type of data structure, such as a linked list, a tree, a hash table, a database, or any other type of data structure. The data structures may include information generated by a device and/or component. Additionally, or alternatively, the data structures may include information provided from any other source, such as information provided by one or more users, and/or information automatically provided by one or more other devices.

As used herein, the term "component" is intended to be broadly construed as hardware, firmware, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the possible implementations. In fact, many of these features may be combined in ways not specifically recited in the claims and/or disclosed in the specification.

No element, act, or instruction used herein should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
   a memory; and
   a processor to:
   identify a first intermediary device storing cached content and responsible for delivering one or more anycast streams in a first service area associated with a first foreign agent;
   identify an active anycast stream of the one or more anycast streams being delivered by the first intermediary device,
   the active anycast stream including the cached content;
   identify a second foreign agent, the second foreign agent being associated with a mobility event associated with a second service area,
   the mobility event including a transition by a mobile device from the first service area to the second service area;
   identify a second intermediary device storing the cached content and responsible for delivering an anycast stream, including the cached content, that originates in the second service area associated with the second foreign agent;

receive an indication that the second intermediary device is different from the first intermediary device responsible for delivering the active anycast stream to the first service area;
establish a content tunnel between the first foreign agent and the second foreign agent to deliver the active anycast stream from the first intermediary device, responsible for delivering the active anycast stream in the first service area, to the second service area;
classify the active anycast stream into a classification based on a classification parameter; and
route communications for the mobile device, associated with the active anycast stream and from the first intermediary device, between the first foreign agent associated with the first service area and the second foreign agent associated with the second service area via the content tunnel and without routing the communications via the second intermediary device responsible for delivering the anycast stream that originates in the second service area,
the communications associated with the active anycast stream being routed via the content tunnel based on the classification, and
the first intermediary device and the second intermediary device having a same anycast address.

2. The system of claim 1, when establishing the content tunnel, the processor is to at least one of:
establish a new content tunnel between the first foreign agent and the second foreign agent; or
select an existing content tunnel between the first foreign agent and the second foreign agent.

3. The system of claim 1, the classification parameter comprising at least one of:
a network address for a source of the active anycast stream;
a network address for a destination of the active anycast stream;
a port identifier for the source of the active anycast stream;
a port identifier for the destination of the active anycast stream;
an Internet protocol (IP) precedence value associated with the active anycast stream;
an application type associated with the active anycast stream; or
a mobile home network address associated with the active anycast stream.

4. The system of claim 1, the one or more anycast streams comprising at least one of:
one or more anycast streams registered in the first service area associated with the first foreign agent;
one or more anycast streams being transmitted in the first service area associated with the first foreign agent;
one or more anycast streams being received in the first service area associated with the first foreign agent;
one or more anycast streams expected to be transmitted in the first service area associated with the first foreign agent during a particular time period; or
one or more anycast streams expected to be received in the first service area associated with the first foreign agent during the particular time period.

5. The system of claim 1, the mobility event comprising at least one of:
a pending mobility event that has not yet been completed; or
a completed mobility event.

6. The system of claim 1, the processor being further to:
receive an indication that the content tunnel has not transported content for a particular period of time; and
terminate the content tunnel based on the indication.

7. The system of claim 1, the processor being further to:
detect a second mobility event associated with the second foreign agent and a third foreign agent;
establish a second content tunnel, the second content tunnel comprising at least one of:
a connection between the first foreign agent and the third foreign agent; or
a connection between the second foreign agent and the third foreign agent; and
route communications associated with the active anycast stream over the second content tunnel.

8. The system of claim 1, where the processor is further to:
receive a pending mobility event notification,
the pending mobility event notification including at least one of:
an identification of the second foreign agent,
an identification of the active anycast stream, or
an identification of the first intermediary device.

9. A non-transitory computer-readable medium storing instructions, the instructions comprising:
one or more instructions that, when executed by one or more processors of a device, cause the one or more processors to:
identify one or more active anycast streams;
identify a first intermediary device storing cached content and responsible for delivering the one or more active anycast streams, including the cached content, in a first service area associated with a first foreign agent;
identify an active anycast stream of the one or more active anycast streams being delivered by the first intermediary device,
the active anycast stream including the cached content;
identify a second foreign agent, the second foreign agent being associated with a mobility event associated with a second service area,
the mobility event including a transition by a mobile device from the first service area to the second service area;
identify a second intermediary device storing the cached content and responsible for delivering the active anycast stream, including the cached content, that originates in the second service area associated with the second foreign agent;
compare the first intermediary device and the second intermediary device,
the first intermediary device being responsible for delivering a particular active anycast stream, of the one or more active anycast streams, in the first service area, and the second intermediary device being responsible for delivering the particular active anycast stream in the second service area;
transmit a request to establish a content tunnel, between the first foreign agent and the second foreign agent, which delivers the particular active anycast stream from the first intermediary device, responsible for delivering the active anycast stream in the first service area to the second service area;
classify the active anycast stream into a classification based on a classification parameter; and route communications for the mobile device, associated with the particular active anycast stream and from the first intermediary device, between the first foreign agent associated with the first service area and the second foreign agent associated with the second service area via the content tunnel and without routing the communications via the second intermediary device responsible for delivering the active anycast stream that originates in the second service area, the communications associated with the active anycast stream being routed via the content tunnel based on the classification, and the first intermediary device and the second intermediary device having a same anycast address.

10. The non-transitory computer-readable medium of claim 9, the one or more instructions further comprising instructions to:

store, in a memory, an identification of the one or more active anycast streams;

store, in a memory, an identification of the first intermediary device;

detect the mobility event; and transmit, based on the mobility event, the stored identification of the one or more active anycast streams, the stored identification of the first intermediary device, and an identification of aforeign agent associated with the mobility event.

11. The non-transitory computer-readable medium of claim 10, the mobility event comprising at least one of:

a pending mobility event that has not yet been completed; or a completed mobility event.

12. The non-transitory computer-readable medium of claim 9, the one or more instructions further comprising instructions to:

store, in a memory, an indication that the first intermediary device is different from the second intermediary device; and the one or more instructions to transmit the request to establish the content tunnel including one or more instructions to:

transmit the request to establish the content tunnel for the particular active anycast stream based on the indication that the first intermediary device is different from the second intermediary device.

13. The non-transitory computer-readable medium of claim 9, the one or more instructions further comprising instructions to:

identify one or more third intermediary devices responsible for delivering the one or more active anycast streams in a third service area;

compare the first intermediary device to a third intermediary device, of the one or more third intermediary devices, the third intermediary device being responsible for delivering the particular active anycast stream in the third service area; and transmit a request to establish another content tunnel based on an indication that the first intermediary device is different from the third intermediary device.

14. The non-transitory computer-readable medium of claim 9, the one or more instructions further comprising instructions to:

establish a new content tunnel between the first foreign agent and the second foreign agent; or select an existing content tunnel between the first foreign agent and the second foreign agent.

15. A method, comprising:

detecting, by at least one processor, a mobility event, the mobility event including a transition by a mobile device from a first service area to a second service area;

determining, by the at least one processor, a first intermediary device storing content and responsible for delivering one or more active anycast streams, including the content, in the first service area associated with a first foreign agent;

identifying, by the at least one processor, an active anycast stream, of the one or more active anycast streams, being delivered by the first intermediary device, the active anycast stream including the content;

identifying, by the at least one processor, a second foreign agent, the second foreign agent being associated with the mobility event associated with the second service area;

determining, by the at least one processor, a second intermediary device storing the content and responsible for delivering the active anycast stream, including the content, that originates in the second service area associated with a second foreign agent;

comparing, by the at least one processor, the first intermediary device to the second intermediary device;

determining, by the at least one processor, that the first intermediary device is different from the second intermediary device;

transmitting, by the at least one processor, a request to establish a content tunnel, between the first foreign agent and the second foreign agent which delivers the active anycast stream from the first intermediary device, responsible for delivering the active anycast stream in the first service area, to the second service area;

classifying, by the at least one processor, the active anycast stream into a classification based on a classification parameter; and routing, by the at least one processor, communications for the mobile device, associated with the active anycast stream and from the first intermediary device, between the first foreign agent associated with the first service area and the second foreign agent associated with the second service area via the content tunnel and without routing the communications via the second intermediary device responsible for delivering the active anycast stream that originates in the second service area, the communications associated with the active anycast stream being routed via the content tunnel based on the classification, and the first intermediary device and the second intermediary device having a same anycast address.

16. The method of claim 15, the classification parameter comprising at least one of:

a network address for a source of the active anycast stream;

a network address for a destination of the active anycast stream;

a port identifier for the source of the active anycast stream;

a port identifier for the destination of the active anycast stream;

an Internet protocol (IP) precedence value associated with the active anycast stream;

an application type associated with the active anycast stream; or a mobile home network address associated with the active anycast stream.

17. The method of claim 15, further comprising:
establishing, by the at least one processor, the content tunnel to transport the active anycast stream, the establishing comprising at least one of:
   establishing a new content tunnel over which to route communications associated with the active anycast stream; or
   selecting an existing content tunnel over which to route communications associated with the active anycast stream.

18. The method of claim 15, further comprising:
identifying a third intermediary device responsible for delivering the active anycast streams in a third service area;

comparing the first intermediary device to the third intermediary device; and
transmitting a request to establish a second content tunnel based on an indication that the first intermediary device is different from the third intermediary device.

19. The method of claim 15, further comprising:
receiving an indication that the content tunnel has not transported content for a particular period of time; and
terminating the content tunnel based on the indication.

20. The method of claim 15, further comprising:
receiving a completed mobility event notification,
   the completed mobility event notification including at least one of:
      an identification of the second foreign agent,
      an identification of the active anycast stream, or
      an identification of the first intermediary device.

* * * * *